United States Patent
Seemann

(10) Patent No.: US 7,155,307 B2
(45) Date of Patent: Dec. 26, 2006

(54) SURFACE ADHERING TOOL CARRYING ROBOT

(76) Inventor: Henry R. Seemann, 2320 N. 196th St., Suite Q201, Seattle, WA (US) 98133

(*) Notice: Subject to any disclaimer, the term of this patent is extended or adjusted under 35 U.S.C. 154(b) by 273 days.

(21) Appl. No.: 10/238,302

(22) Filed: Sep. 9, 2002

(65) Prior Publication Data

US 2003/0048081 A1 Mar. 13, 2003

Related U.S. Application Data

(60) Provisional application No. 60/318,296, filed on Sep. 9, 2001.

(51) Int. Cl.
*G06F 19/00* (2006.01)

(52) U.S. Cl. .................. 700/245; 700/258; 180/7.1; 180/8.1; 180/164; 318/68; 318/568.12; 15/21.1; 15/53.4; 15/317; 15/327.1; 294/64.1; 900/1

(58) Field of Classification Search ............... 700/245, 700/258; 318/68, 568.12; 15/21.1, 53.4, 319, 15/327.1; 180/164, 7.1, 8.1; 294/64.1; 900/1
See application file for complete search history.

(56) References Cited

U.S. PATENT DOCUMENTS

| | | |
|---|---|---|
| 3,628,625 A | 12/1971 | Boyles, Jr. |
| 3,955,642 A | 5/1976 | Shino et al. |
| 4,095,378 A | 6/1978 | Urakami |
| 4,193,469 A | 3/1980 | Graf |
| 4,330,865 A | 5/1982 | Hyde et al. |
| 4,345,658 A | 8/1982 | Danel et al. |
| 4,664,212 A | 5/1987 | Nagatsuka et al. |
| 4,688,289 A | 8/1987 | Urakami |
| 4,699,252 A | 10/1987 | Sing |
| 4,785,902 A | 11/1988 | Ochiai |
| 4,865,140 A | 9/1989 | Cottam |

(Continued)

FOREIGN PATENT DOCUMENTS

| | | |
|---|---|---|
| DE | 2306044 | 9/1974 |
| EP | 0710 188 B1 | 10/2001 |
| GB | 2112474 A | 7/1983 |
| GB | 2268457 A | 1/1994 |
| RU | 1563968 A1 | 5/1990 |

OTHER PUBLICATIONS

Web Page http://www.dynabrade.com/cgi-bin/Industrial/58215?25WMxfrt;;4 Industrial Power Tools, Accessories & Abrasives, "5 inch Non-Vac Dynorbital ® Supreme II Random Orbital Sander", Model No. 58215 (3 sheets)—Oct. 5, 2004.

(Continued)

*Primary Examiner*—Thomas G. Black
*Assistant Examiner*—McDieunel Marc
(74) *Attorney, Agent, or Firm*—R. Reams Goodloe, Jr.

(57) ABSTRACT

A surface clinging robotic device. The device includes a supporting structure or base, on which is mounted (a) a lead pivoting support surface, such as a pivoting wheel, and (b) two or more traction drives, such as drive wheels. Each of the traction drives are independently driven by a separate drive motor. A plurality of vacuum cups are mounted on the bottom of the base. The vacuum cups each have a low friction foot designed for movement over a surface with minimal friction while vacuum is maintained. The low friction foot portion is provided by a generally surface direction oriented C-shaped Teflon skin. The robotic device can move over gaps or obstructions in the surface without losing vacuum in all of the vacuum cups, using a fluid limiting valve at each vacuum cup to interrupt flow in the event of loss of vacuum in that vacuum cup.

28 Claims, 10 Drawing Sheets

U.S. PATENT DOCUMENTS

| | | | |
|---|---|---|---|
| 4,926,957 | A | 5/1990 | Urakami |
| 4,940,382 | A | 7/1990 | Castelain et al. |
| 4,971,591 | A | 11/1990 | Raviv et al. |
| 4,997,052 | A | 3/1991 | Urakami |
| 5,014,803 | A | 5/1991 | Urakami |
| 5,161,631 | A | 11/1992 | Urakami |
| 5,194,032 | A | 3/1993 | Garfinkel |
| 5,351,626 | A | 10/1994 | Yanagisawa |
| 5,351,773 | A | 10/1994 | Yanagisawa |
| 5,355,807 | A | 10/1994 | Pelrine et al. |
| 5,366,038 | A | 11/1994 | Hidetsugu et al. |
| 5,388,528 | A | 2/1995 | Pelrine et al. |
| 5,429,009 | A | 7/1995 | Wolfe et al. |
| 5,435,405 | A | 7/1995 | Schempf et al. |
| 5,487,440 | A | 1/1996 | Seemann |
| 5,490,646 | A | 2/1996 | Shaw et al. |
| 5,506,682 | A | 4/1996 | Pryor |
| 5,536,199 | A | 7/1996 | Urakami |
| 5,551,525 | A | 9/1996 | Pack et al. |
| 5,570,992 | A | 11/1996 | Lemelson |
| 5,574,347 | A | 11/1996 | Neubauer |
| 5,575,346 | A | 11/1996 | Yberle |
| 5,588,900 | A | 12/1996 | Urakami |
| 5,592,998 | A | 1/1997 | Urakami |
| 5,609,216 | A | 3/1997 | Fisher et al. |
| 5,633,707 | A | 5/1997 | Seemann |
| 5,672,044 | A | 9/1997 | Lemelson |
| 5,730,553 | A | 3/1998 | Miura et al. |
| 5,752,577 | A | 5/1998 | Urakami |
| 5,809,099 | A | 9/1998 | Kim et al. |
| 5,819,863 | A | 10/1998 | Zollinger et al. |
| 5,839,532 | A | 11/1998 | Yoshiji et al. |
| 5,857,534 | A | 1/1999 | DeVault et al. |
| 5,890,250 | A | 4/1999 | Lange et al. |
| 5,890,553 | A | 4/1999 | Bar-Cohen et al. |
| 5,959,423 | A | 9/1999 | Nakanishi et al. |
| 5,959,424 | A | 9/1999 | Elkmann et al. |
| 6,000,484 | A | 12/1999 | Zoretich et al. |
| 6,000,844 | A | 12/1999 | Cramer et al. |
| 6,046,565 | A | 4/2000 | Thorne |
| 6,053,267 | A | 4/2000 | Fisher |
| 6,090,221 | A | 7/2000 | Gan et al. |
| 6,099,091 | A | 8/2000 | Campbell |
| 6,102,145 | A | 8/2000 | Fisher |
| 6,105,695 | A | 8/2000 | Bar-Cohen et al. |
| 6,170,109 | B1 | 1/2001 | Jesadanont et al. |
| 6,189,177 | B1 | 2/2001 | Shook et al. |
| 6,263,989 | B1 | 7/2001 | Won |
| 6,276,478 | B1 | 8/2001 | Hopkins et al. |
| 6,389,329 | B1 | 5/2002 | Colens |
| 6,527,071 | B1 * | 3/2003 | Villedieu .................... 180/8.1 |
| 6,633,150 | B1 * | 10/2003 | Wallach et al. ........ 318/568.12 |
| 2001/0013434 | A1 * | 8/2001 | Hopkins ...................... 180/7.1 |
| 2002/0036108 | A1 | 3/2002 | Jeswine et al. |
| 2003/0048081 | A1 | 3/2003 | Seemann |

OTHER PUBLICATIONS

Web Page http://www.dynabrade.com/cgi-bin/Industrial/57810?25WMxfrt;;7 Industrial Power Tools, Accessories & Abrasives, "Dynabug ® Orbital sander (Non Vac)", Model No. 57810 (3 sheets) Oct. 5, 2004.

Gupton, James, "Nuclear Power Plant Emergency Damage Control Robot", Robotics Age, Mar./Apr. 1983, pp. 18–21).

60–128082 (A)—Japan (Jul. 8, 1985)—Abstract of Kokai No. 58–234639, (Masajirou Godai).

60–138458 (A)—Japan (Jul. 23, 1985)—Abstract of Kokai No. 246435, (Mito).

61–119478 (A)—Japan (Jun. 6, 1986)—Abstract of Kokai No. 59–238622, (Hitoshi Iida).

FR 2599–772 (A)—France (Dec. 11, 1987)—Abstract of France Patent Application No. 008026.

64–78987 (A)—Japan (Mar. 24, 1989)—Abstract of Kokai No. 232540 , (Mito).

1–141184 (A)—Japan (Jun. 2, 1989)—Abstract of Kokai No.: 62–296186, (Koichi Negishi).

1–228785 (A)—Japan (Sep. 12, 1989)—Abstract of Kokai No. 63–54712.

2–15985 (A)—Japan (Jan. 19, 1990) Abstract of Kokai No. 63–165533, ((Takeji Nakamachi).

1563–968 (A)—Russia (May 15, 1990) Abstract (472761—Mar. 23, 1988) (1 sheet).

2–127179 (A)—Japan (Jun. 5, 1990)—Abstract of Kokai No. 63–282179, (Masaki Hori).

2–284897 (A)—Japan (Nov. 22, 1990)—Abstract Kokai No. 64–104497, (Kouji Umenishi).

3–581 (A)—Japan (Jan. 7, 1991)—Abstract of Kokai No. 64–134664, (Koichi Wada).

3–16887 (A)—Japan (Jan. 24, 1991)—Abstract of Kokai No. 149705, (Kenichi Nagatsuka).

3–79282 (A)—Japan (Apr. 4, 1991)—Abstract of Kokai No. 64–218289, (Wataru Isomura).

3–166075 (A)—Japan (Jul. 18, 1991)—Abstract of Kokai No. 64–304393, (Takashi Iwakawa).

3–213279 (A)—Japan (Sep. 18, 1991)—Abstract of Kokai No. 2–7224, (Makoto Yamashita).

4–46780 (A)—Japan (Feb. 17, 1992)—Abstract of Kokai No. 2–278926, (Toru Mita).

4–154494 (A)—Japan (May 27, 1992)—Abstract of Kokai No. 2–278926, (Toshimichi Takigawa).

4–166481 (A)—Japan (Jun. 12, 1992)—Abstract of Kokai No. 2–290656, (Hideyuki Uesugi).

5–50955 (A)—Japan (Mar. 2, 1993)—Abstract of Kokai No. 3–28340, (Tomokichi Ibe).

5–131381 (A)—Japan (May 28, 1993)—Abstract of Kokai No. 3–137955), (Aaru H. Jiyon).

43 13 719 A1—Germany (Nov. 3, 1994) Abstract (Yberle, H.).

Siegel, M.W. "Automation for NonDestructive Inspection of Aircraft". (Senior Research Scientist, The Robotics Institute, School of Computer Science) Carnegie Mellon University Pittsburgh; (1994), pp. 1–11.

* cited by examiner

SURFACE ADHERING TOOL CARRYING ROBOT

RELATED PATENT APPLICATIONS

This invention is related to U.S. Provisional Patent Application Ser. No. 60/318,296, filed on Sep. 9, 2001, entitled Inspection Tool Carrying Robot, the disclosure of which is incorporated herein in its entirety by this reference.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to robotic devices, and more particularly, to devices designed for autonomous travel over surfaces, and more particularly, over discontinuous flat surface, or curved surfaces such as those encountered on aircraft or ships, especially the hulls of such vessels.

BACKGROUND

Various types of surfaces, such as stationary surfaces (on buildings and especially their windows), or such as mobile surfaces (on transport vessels, such as aircraft and ships), have periodic needs for cleaning, inspection, and other repair or maintenance operations. A wide variety of robotic devices have heretofore been used or proposed in various situations for performing a variety of working operations, such as cleaning or polishing surfaces, that are not easily accessible for manual conduct of such operations. In general though, the most successful prior art robotic devices have been used on flat or planer surfaces such as windows, building panels and the like. That is because such prior art devices typically operate with vacuum equipment that easily moves over smooth, continuous surfaces. However, various prior art robotic devices suffer from partial or complete vacuum loss which can result in detachment of the robot from the surface when they encounter uneven, discontinuous, or curved surfaces (and particular surfaces with multiple curvatures).

Unfortunately, in many applications for robotic devices, the presence of discontinuous or multiple curved surfaces are encountered. In one potential application, namely the inspection and maintenance of the surfaces of large commercial aircraft, such multiple curvature type surfaces are encountered at a variety of locations. Use of robots in such an application has heretofore been problematic, even though the potential is great. Instead of using robots, due to the large size and shape of such aircraft, it is currently customary to erect a scaffold alongside of the aircraft, and to employ a number of workers supported on the scaffold to hand scrub the aircraft surfaces. After scrubbing, the aircraft is waxed and polished using manual rotary buffers. Such buffers are relatively heavy, and due to the enormous surface area of large commercial aircraft, buffing operations are tedious and time consuming. For example, the entire operation of scrubbing, waxing and buffing a large commercial transport aircraft often takes a period of time in the 20 to 30 hour range, utilizing 10 or more workers.

In another related and important potential robotic application, commercial aircraft are subjected to a non-destructive inspection after a specified number of cycles of pressurization, for example about 7,000 cycles of pressurization for aircraft under regulation by the United States Federal Aviation Administration. Each take-off and landing in which the aircraft is pressurized is considered to be one pressurization cycle. In a typical non-destructive inspection, the paint is stripped entirely from the aircraft, and the seams and rivets are manually inspected. If a defect is observed during the inspection, the area of the defect is marked for further evaluation. Such suspect areas are then subjected to additional tests, such as an eddy-current sensor test, to determine the nature and magnitude of the defect. After further inspection and necessary repair, the aircraft is repainted, and is then waxed and buffed.

The normal paint stripping, inspecting, repainting, waxing, and buffing operation is extremely time-consuming and labor intensive, resulting in a substantial expenditure. Also, the paint stripping operation presents a potentially serious environmental problem, in that solvents are often used to remove the paint. Thus, pollution abatement equipment is then necessary in order to remove the solvent fumes from the paint stripping area.

In the various prior art robotic devices which have attempted to navigate the surfaces of aircraft, and particularly aircraft hulls, the presence of (a) gaps in the skins, which result in loss of vacuum in devices which depend on sequential vacuum locomotion, and/or (b) tight radius or compound curves, which confound various locomotion schemes, have resulted in the inability of such prior art devices to successfully navigate such surfaces. Accordingly it would be desirable to provide a robotic device that can easily traverse gaps in surfaces, and which can easily maneuver over curved surfaces, particularly curved surfaces with multiple radii or compound curved surfaces.

Similarly, in other applications such as buildings, when traversing discontinuities such as window frames, or sealant gaps between installed building panels, the presence of such discontinuities result in partial or complete loss of vacuum in many prior art devices. Likewise, it would be desirable to provide a robotic device that can easily traverse surface discontinuities and gaps.

SUMMARY

I have now developed novel robotic device(s) suitable for carrying inspection devices or other tools for performing an inspection or other working operation on a workpiece surface. Such device(s) provide a unique and cost effective unit that provides a tenacious hold on a workpiece surface, particularly those having (a) compound surface curvature, or (b) surface discontinuities or irregularities. The high degree of mobility of such devices, and exceptional payload capacity to weight ratio, make such devices a clear choice for the carriage of inspection instruments and end effector working tools. Importantly, such device(s) can carry various inspection and recording instruments, such as eddy current inspection units, magneto-optical units, video cameras, ultrasonic testing units, laser diode ultrasound units. Working tools such as high pressure paint strippers (including vacuum hoses for capturing sanding or other work debris), machine tools, sanders, washer brushes, window cleaning solutions, wax applicators, buffers, paint applicators, or the like may be easily utilized with such devices.

The robotic device includes a supporting structure or frame, on which is mounted a plurality of vacuum cups which have a lip seal portion with a low coefficient of friction adapted for easily sliding over a surface to which the robot adheres. In one embodiment, the drive is provided by a plurality of drive wheels. In another embodiment, drive is provided by surface contacting driven endless belts. For ease in turning, a non-driven pivoting wheel can be provided when appropriate for a particular application. In the various embodiments, a sufficient number of the driven tracks or wheels or other traction drives are independently driven by a separate motors that are mounted on the frame. In one embodiment, the motors are electrical, direct current motors, and for ease of acquisition and use, typically 24 volt DC motors are utilized. In one embodiment, the drive motors are connected with the traction devices (wheels or belts) by an endless member, such as a link chain, utilizing a sprocket on motor and/or traction drive for reliably moving the interconnecting link chain. In another embodiment, rubberized belt tracks can be directly and independently driven. In any event, embodiments are provided that are fully controllable in x- and x-axis and are capable of rotating about their centers. Such devices perform well on horizontal and vertical services, including inverted surfaces such as an aircraft fuselage portion or the underside of a wing.

In one embodiment, a plurality of vacuum cups are mounted on the frame, each having a surface facing opening. The vacuum cups each have a low friction lip portion which is designed for movement over a surface to be traversed with minimal friction while at least some vacuum is maintained in the vacuum cup with respect to the ambient fluid, which is normally air. In one embodiment, the low friction lip portion of each vacuum cup is provided by a workpiece surface contacting C-shaped Teflon skin, where the center of the C opening in the "C" is directed upward toward a vacuum outlet, and the closed end is directed against the workpiece surface. In one embodiment, the vacuum cups are provided in pairs, with at least a first pair and a second pair, sequentially located with respect to the normal direction of travel of the robot. More preferably, a first pair, a second pair, and a third pair are provided sequentially located with respect to the normal direction of travel of the robot. In this manner, loss of vacuum in a first pair of vacuum cups at a surface discontinuity of a workpiece does not defeat the ability of the robot to continue to adhere to the workpiece surface via second or subsequent pairs of vacuum cups.

Each of the vacuum cups have outlet ports in fluid communication with a vacuum header. The vacuum header is in fluid communication with a vacuum source, such as a remote vacuum pump. Normally, a flexible vacuum hose is connected to the robot as part of an externally supported umbilical utility line. In one important embodiment, a fluid limiting valve is placed at the inlet to the outlet port from each vacuum cup. The fluid limiting valve, may be in the form of a reed valve which is responsive to pressure PdA drag (pressure acting over the surface area of the valve exposed to the flow) of the outlet flow, to substantially reduce the volume of air which can escape out of the outlet port in the event a sudden large outlet flow occurs. In one embodiment, the fluid limiting valve has a small passageway therethrough which allows a small flow of air to continue escape therethrough. In this manner, the vacuum within the vacuum cup is readily re-established once the vacuum cup has moved sufficiently so as to then avoid a fluid flow increasing surface discontinuity. Consequently, at that time, airflow outward through the vacuum outlet reduces so that the flow limiting valve is no longer held closed. With this approach, the robot device provides a method for movement across a surface wherein during a first step of travel, at least a first vacuum cup holds the robot against a surface, and then, at least a second vacuum cup holds the robot against a surface, and wherein the second vacuum cup holds the robot against a surface before the first vacuum cup ceases to be effective in holding the device against the surface, and wherein at least a first vacuum cup resumes holding the robot against the surface before the second vacuum cup ceases to be effective in holding the device against the surface. More preferably, a first pair, a second pair, and a third pair of vacuum cups are provided, and at least a first pair of vacuum cups initially secure the robot to a surface, and then at least a second pair secure the robot to a surface before the first pair of vacuum cups cease to be effective, and either the first pair of vacuum cups resume effectiveness, or a third pair of cups begin effectiveness at holding the device against the surface, before the second pair of cups cease to be effective at holding the robot against a surface. The basic concept is that given a plurality of vacuum cups, sufficient cups are oriented with respect to the direction of travel that before all other vacuum cups cease to be effective, at least one vacuum cup is in a position, with respect to the direction of travel, that it is able to secure the robot until other vacuum cups resume effectiveness. Thus, the robotic device can move over gaps, discontinuities, or obstructions in a workpiece surface without losing vacuum in all of the available vacuum cups. If for example, the device moves over a crack causing a loss of vacuum in one or more of the vacuum cups, the vacuum will be retained in the remaining vacuum cups to thereby maintain the device in adhering contact with the surface.

One use of the robotic device is for non-destructive inspection of aircraft. In such uses, the robotic device can be guided utilizing a guidance system, such as an infrared or a laser tracking system. In an embodiment utilizing laser guidance, one or more laser units are mounted on the ground adjacent the aircraft and a retro-reflector or cats-eye is mounted on a support carried by the robotic device. The support is slidable relative to the robotic device and is biased downwardly so that a shoe or sensor carried by the support will ride against the surface of the aircraft. As the robotic device moves in the desired path of travel over the aircraft surface, the sensor or shoe rides on the surface, and through the laser tracking system, the surface of the aircraft is mapped. The aircraft is then pressurized and the surface is again mapped and any surface deviations, outside of a given tolerance, indicate possible defects in the aircraft surface. In another embodiment, an infrared system can be used to provide for tracking. In yet another embodiment, an on-board camera (CCD or other suitable device) can be utilized in conjunction with a computerized evaluation software program to either autonomously or semi-autonomously evaluate and direct the travel of a robotic frame carrying either an inspection or a working device along the track of a joint, or a row of fastener locations, or other structure to be observed, inspected, evaluated, or on which work is to be performed.

The use of this robotic device and a suitable tracking system enable easy non-destructive inspection of an airframe. Also, use of such a robotic device can minimize the necessity of visual inspection operations, and virtually eliminate the necessity for manual paint stripping, manual repainting, and manual waxing of aircraft as has been conventionally practiced heretofore. Importantly, the use of such a robotic device substantially reduces the overall time and cost of the non-destructive inspection.

Importantly the robotic device taught herein can be employed to move a working implement over a workpiece surface. The working implement can be a washer, sander, scrubber, buffer, paint sprayer, or the like. By utilizing the robotic device to perform these working operations the extensive hand labor normally required to wash, wax and or paint a workpiece surface, such as an aircraft or building exterior, is substantially reduced. As a further advantage, the robotic device(s) disclosed and taught herein enables a constant application of pressure to be applied through the implement to the workpiece surface, thus providing a more uniform cleaning and polishing operation than feasible in manual operations. And, importantly, the decreased use of manual labor significantly reduces the incidence of carpal tunnel syndrome and other industrial injuries commonly associated with such operations.

In practice, most of the weight (such as up to about 85% or more) of the various vacuum lines, electrical control and power cables, pressurized fluid lines, and data input and output lines such as fiber optic cables, may be carried by an umbilical support system for the robotic device. However, the robotic device(s) taught herein are also capable of remote, autonomous, or semi-autonomous operation, using wireless or semi-wireless communication, such as via infrared, "Bluetooth", or radio frequency communications. Application specific or general computer control software can provide for either manual direction over a surface, or for running the device over a pre-programmed route. Importantly, software is capable of controlling the system when using laser, vision, sonic, infrared, or other suitable methods of location and tracking.

Connection to a general purpose computer, whether by wireless or via hard wire or optical fiber or other medium provides for collection and storage in a database of user selected information. For example, with aircraft inspection in conjunction with suitable software, the robotic device can perform crack identification and crack analysis as well as provide mapping of each aircraft's surface, including all fastener locations.

In summary, I have developed a novel robotic device that it is capable of moving over surface discontinuities and deviations, such as obstructions or gaps, without losing grip on the surface. In one embodiment, a robotic device is provided with a three point ride over the surface, which enables the robotic device to easily to follow the curved contour of an aircraft or other workpiece surface to be inspected or worked.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of robotic devices are also shown and briefly described to enable the reader to understand how various features may be utilized in order to provide an efficient, reliable surface adherent tool carrying robotic device.

DETAILED DESCRIPTION

Figure 1:
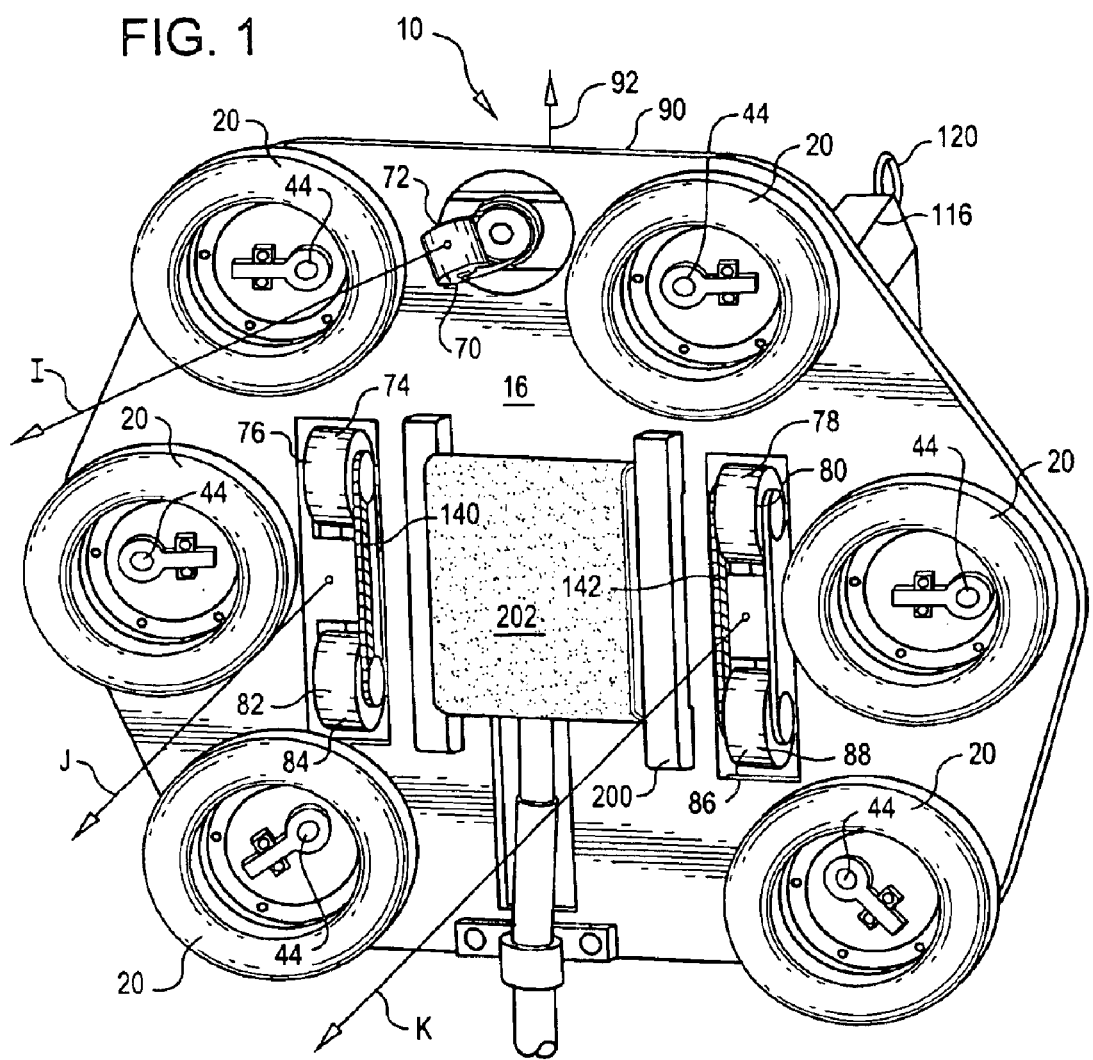
FIG. 1 is bottom perspective view of an exemplary robotic device showing the use of a plurality of vacuum cups (here, three sets of vacuum cups), as well as a pivoting front wheel, and two primary and two follower traction devices (wheels as illustrated) for driving the robotic device across a surface, and a tool working portion mounted on the robotic device for carriage across a workpiece surface while in effective engagement therewith as appropriate for the selected work or inspection activity.
Figure 6:
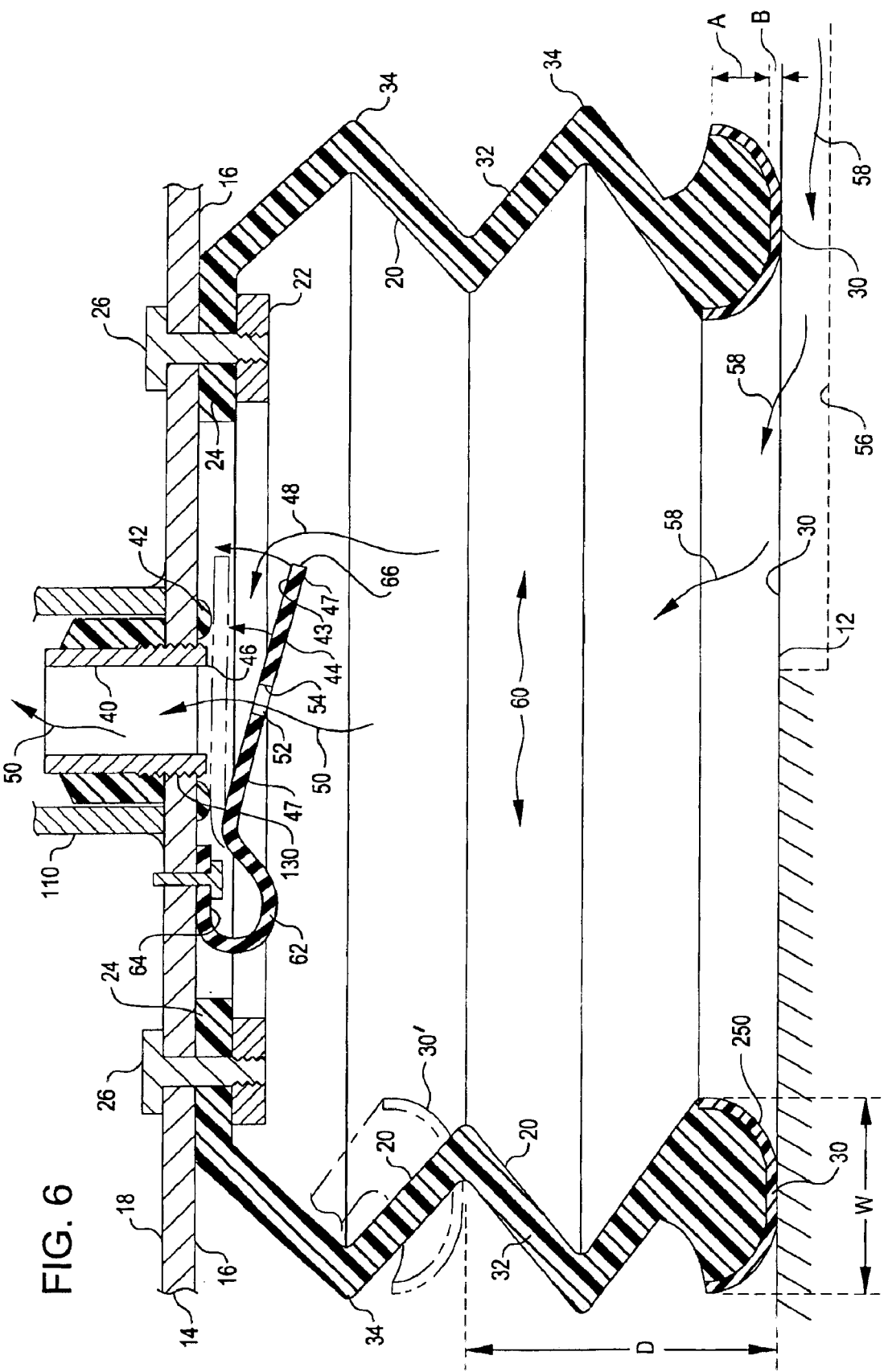
FIG. 6 provides a cross-sectional view of a vacuum cup of the unique design taught herein, showing the expandable and compressible resilient rubber walls, a lower lip having a broad central pad, inwardly curved interior and exterior edge portions, and a lip surface layer of very low friction material, such as a Teflon layer; also shown is a cross-section of the fluid limiting valve (reed valve) and valve seat, as well as an interior mounting ring for affixing the vacuum cup to the base of the robotic device.

Attention is directed to FIG. 1, which shows a robotic device 10 that can be employed to provide a working operation on a workpiece surface. A suitable workpiece surface may be any one of a variety of planer or non-planer surfaces, such as the exterior surface 11 of aircraft 12 (see FIGS. 7 and 8), or surfaces (including windows) of buildings (see window surface 13 in FIG. 9), or other similar surfaces of ships, storage tanks, buildings, bridges, trains, pipelines, billboards or the like. The substrate comprising surface 12 may be metallic such as aluminum, steel, or non-metallic, such as plywood or other wood, concrete, wallboard, stucco, or other materials wherein a vacuum seal can be effected in the manner further described herein. Robotic device 10 includes a base 14 having a bottom side 16 and an upper side 18 (see FIG. 2). A plurality of vacuum cups 20 are provided affixed to the bottom side 16 of base 14. In the embodiment illustrated in FIG. 1, and as further detailed in FIG. 6, a mounting ring 22 is used to compress an upper mounting ring portion 24 of the vacuum cup 20 against the bottom side 16 of base 14. Suitable fasteners 26 or another structure or chemical compound that can accomplish the same result can be used to sealingly affix the vacuum cup 20 to the bottom side 16 of base 14, generally in the manner as shown in FIG. 6. In the embodiment shown in FIG. 6, each of the vacuum cups 20 includes (a) a low friction foot 30 of unique design further described below, and (b) a resilient, flexible, compressible and expandable sidewall 32 of sufficient strength and durability to withstand vacuum use and constant flexing during robotic operations. As illustrated in FIG. 6, the vacuum cup sidewall 32 may include two or more V-flex, accordion pleat shaped corrugations 34. An outlet port 40 is provided with a seal 42 (such as in the shape of a circular 0-ring). The seal 42 is adapted for seating and sealing against a sealing surface 43 of the fluid limiting flapper valve 44. The flapper valve 44 is located in fluid communication with the outlet port 40, and adjacent to seal 42, by being positioned below the inlet portion 46 of the outlet port 40. The fluid limiting valve 44 is biased toward an open position, but is designed to be responsive to pressure of an escaping airstream against the front side 47 of valve 44. In this manner, the fluid limiting flapper valve 44 is responsive to at least partially close off air flow through the outlet port 40. For example, when valve 44 is open, a large flow of fluid can escape by following the outlet path indicated by reference arrow 48. However, when valve 44 closes and sealing surface 43 is mates with seal 42, only a minimum of fluid escapes, via the path shown by reference arrow 50. As seen in both FIGS. 6 and 11, when valve 44 is closed, fluid as indicated by reference arrow 50 escapes only through a small passageway 52 defined by edgewalls 54 in fluid limiting valve 44. As depicted in FIG. 6, this situation occurs, for example when the foot 30 of vacuum cup 20 encounters a discontinuity 56 in a surface 12 being inspected, so that a large volume of fluid passes in the direction of reference arrow 58 from ambient conditions to the interior, fluid containing portion 60 of vacuum cup 20. In such situations, the minimum flow outlet passageway 52 is sized and shaped to allow a preselected fluid flow volume out of the passageway 52, when the fluid limiting valve 44 is in the closed, vacuum loss position. This is useful since vacuum capability (i.e., the quantity of air which can be extracted by the vacuum pump) is not unnecessarily used up in the event of vacuum loss at one, or in the event of vacuum loss at even a number of vacuum cups.

By way of further explanation, the outlet 46 has an outlet seal 42, and the fluid limiting valve 44 has a seal portion 43 that sealingly seats against the outlet seal 43. The fluid limiting valve 44 is thus responsive to fluid flow to move between (a) a normal flow, open position, wherein said valve 44 allows fluid flow unimpeded through the outlet 46, and (b) a vacuum loss, closed position, wherein high flow toward the outlet valve 44 closes the valve 44 so that the seal portion 43 of the fluid limiting valve 44 sealingly seats against the outlet seal 42, until a normal vacuum condition resulting in a low fluid flow situation is restored to the vacuum cup 20. It has been found advantageous to provide a reed type valve for the fluid limiting valve 44, with the valve biased toward a normally open position, such as by a spring (here, spring 62 inherent in the construction of the attachment end 64 of valve 44) of suitable spring force. In one embodiment, clearance in the open position of about 1/10 inch between seat 42 and sealing surface 43 is sufficient, at the outward end 66 of valve 44.

Returning now to FIG. 1, in this embodiment, at least three points of support are provided for the base 14 of the robotic device 10. As illustrated in FIG. 1, the three points of support are (a) a pivotable surface 70 (here shown provided by a pivoting wheel 72), (b) first primary traction drive surface 74 (here provided by first drive wheel 76) and (c) second primary traction drive surface 78 (here provided by second drive wheel 80). These three surfaces just described provide three points of support that are affixed to base 14 and which are adapted to limit the distance of the base 14 relative to the workpiece surface 12 being traversed, so as to limit the working compression range R, i.e., the amount of downward compression available for vacuum cups 20 (such as accommodated by the V-shaped compression portions 34 in the design illustrated in FIG. 6) between the bottom side 16 of the base 14 and the surface 12 being traversed. On hypothetical maximum working compression range distance D is indicated in FIG. 6, where a foot 30' is shown in phantom lines in fully compressed position. This three point support configuration allows the robotic device 10 to function on curved surfaces 12 as if supported by a three legged stool, which of course, can evenly and securely support a structure above an uneven or compound curved surface while all three points are in contact with the workpiece surface 12.

For added drive traction, and support it has been found it appropriate in some embodiments to provide a secondary traction surface for each of the primary traction surfaces. As shown, a first secondary traction surface 82 is provided to move in concert with the first primary traction surface 74. The first secondary traction surface 82 is, as shown in FIG. 1, provided by a wheel 84. Similarly, a second secondary traction surface 86 is provided to move in concert with the second primary traction surface 78. As shown the second secondary traction surface 86 is provided by a wheel 88.

The pivotable contact point 70, located adjacent the normal front 90 of frame 14, allows the robotic device 10 to turn when the device 10 is traveling along a direction of travel such as indicated by reference arrow 92 in FIG. 1.

Figure 2:
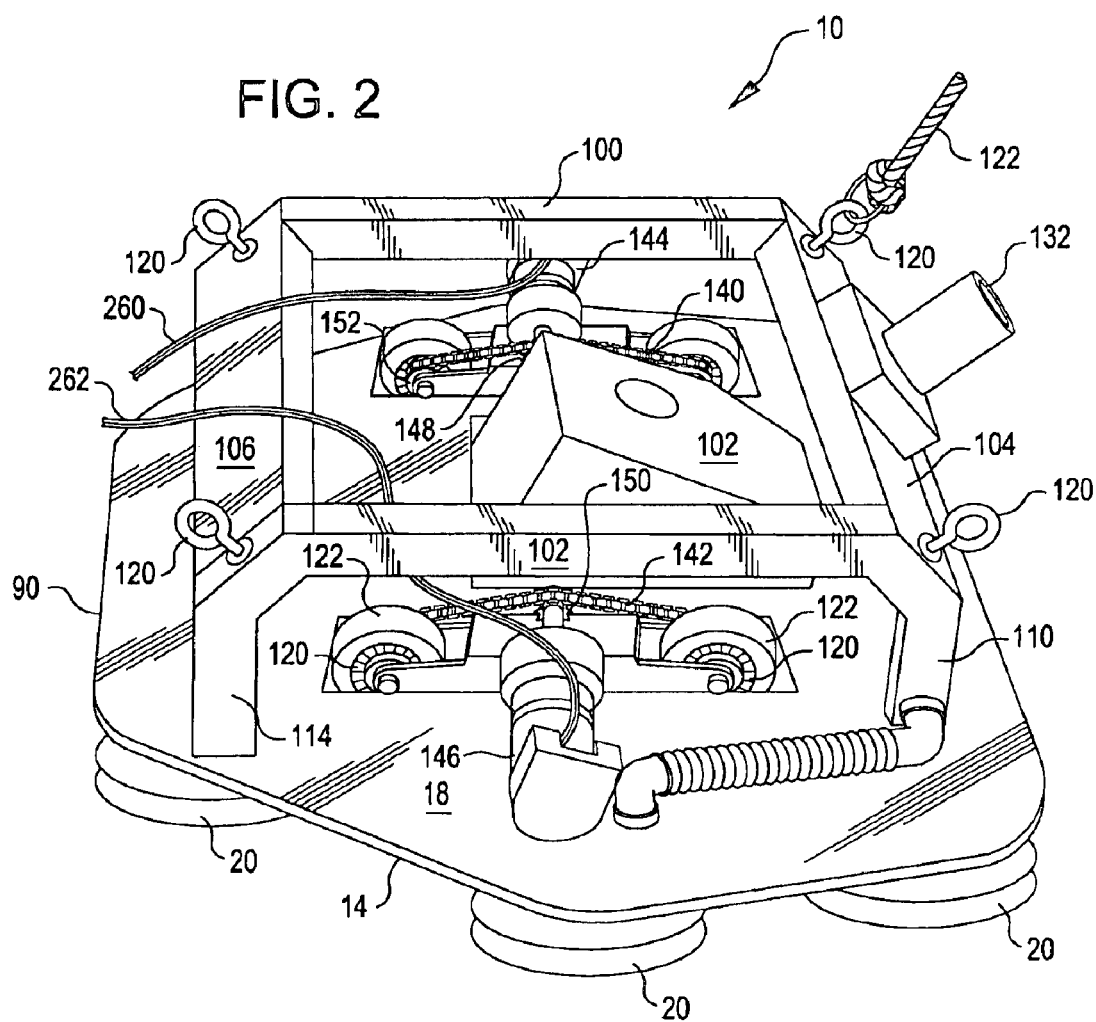
FIG. 2 is a side perspective view of one embodiment of a robotic device, shown disconnected from its umbilical power and vacuum system, but showing the interconnecting tubular frame which serves as a vacuum header that provides internal fluid communication between vacuum cups and the vacuum header outlet, as well as a structural rail for mounting of eyelets for connection of a safety umbilical line; also shown is an inspection tool affixed to a tool receiving mount.
Figure 3:
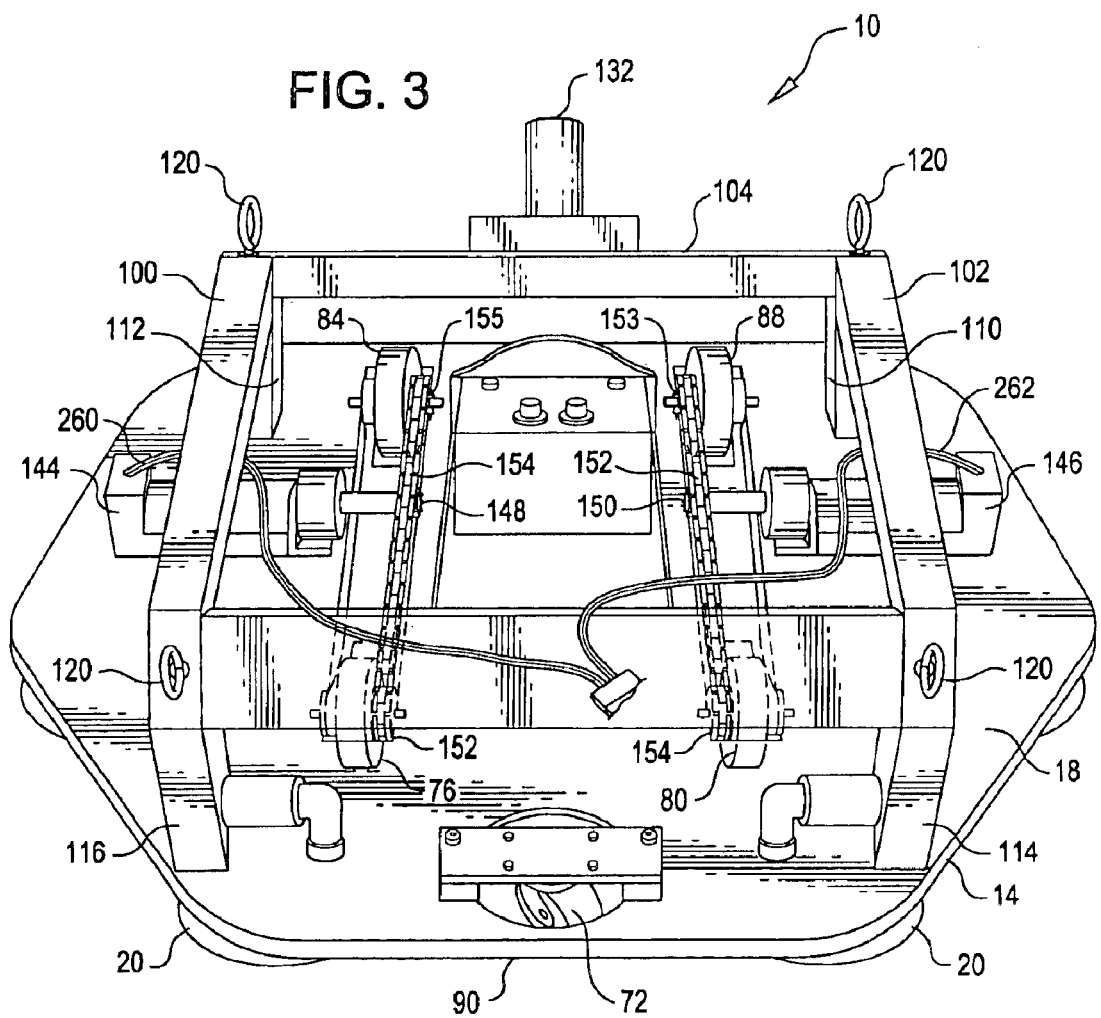
FIG. 3 is a front perspective view of an embodiment similar to that shown in FIG. 2, but now showing the mounting bracket for a pivoting front wheel (other pivoting surface device may be utilized) as well as a pair of drive motors (direct current electric motors as shown), each for driving a set of traction devices (here, sprocket driven resilient compound wheels).

Turning now to FIGS. 2 and 3, tubular frame portions 100, 102, 104, and 106 can be provided for both structural support as well as to provide a vacuum header 108 to connect vacuum inlet legs 110, 112, 114, and 116 to vacuum outlet 118. Each of the just mentioned vacuum inlets and frame portions also provide a structural frame suitable for attachment of eye-bolts 120, which provide attachment points for safety lines 122 (see FIG. 2) and/or umbilical lines 123 (see FIG. 7). Thus, the frame, 124, made up of the just mentioned tubular frame portions and the just mentioned vacuum inlets, provides both a structural and a fluid communication function. Note that as can be further appreciated from FIGS. 6 and 7, the base 14 has a plurality of vacuum apertures 130 therethrough (further defined by outlet ports 40), and that those vacuum apertures 130 are in fluid communication with the vacuum header 108.

Returning now to FIG. 2, additional details of one embodiment of suitable drive components is provided to enable one of ordinary skill in the art to make and use the novel robotic device described herein. As earlier noted, in one embodiment, it has been shown that wheels may be used in certain applications as traction devices to self propel the robotic device 10 across a workpiece surface 12. When utilizing wheels on a robotic device, it has been found advantageous to utilize a lightweight rim 120, such as magnesium or aluminum, with a resilient urethane wheel 122 composition. Ideally, soft wheel compounds are used for maximizing traction. It has been found that such a soft urethane composition having a 30 Shore A durometer is advantageous. For driving the wheels, endless belts 140 and 142 are connected to a drive motors 144 and 146. As illustrated, the endless belts 140 and 142 are provided in the form of a linked chain, and resultantly, drive sprockets 148 and 150 are used at motors 144 and 146, respectively. Idler sprockets 152 and 154 are used at wheels 76 and 80. Idler sprockets 153 and 155 are used at wheels 88 and 84. While I have found it useful to provide the various sprockets in a high molecular weight polyethylene, any suitable substance having the desired strength, stress resistance, and weight characteristics may be utilized.

Figure 16:
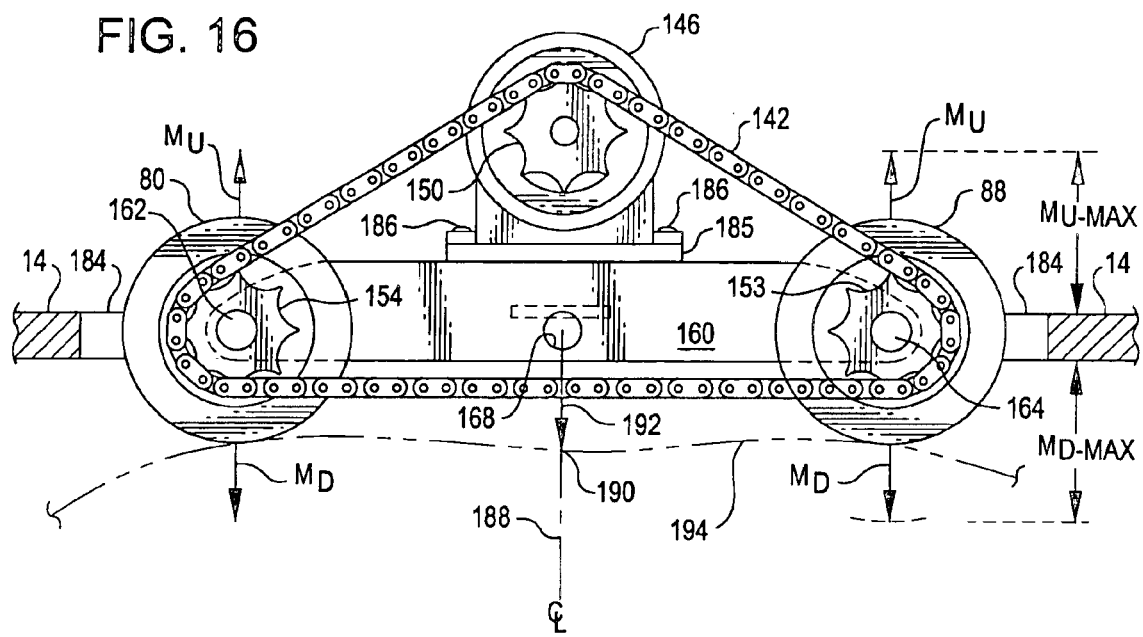
FIG. 16 is a side elevation view of one embodiment for a pivotable truck for mounting traction drive wheels, to further show that one point of pivoting of the robot with respect to the workpiece surface is with respect to the pivot axis of the pivotable truck, rather than either one of the driven wheels themselves, and also showing how a drive motor and a pair of endless belt driven wheels are mounted on the pivotable truck.
Figure 17:
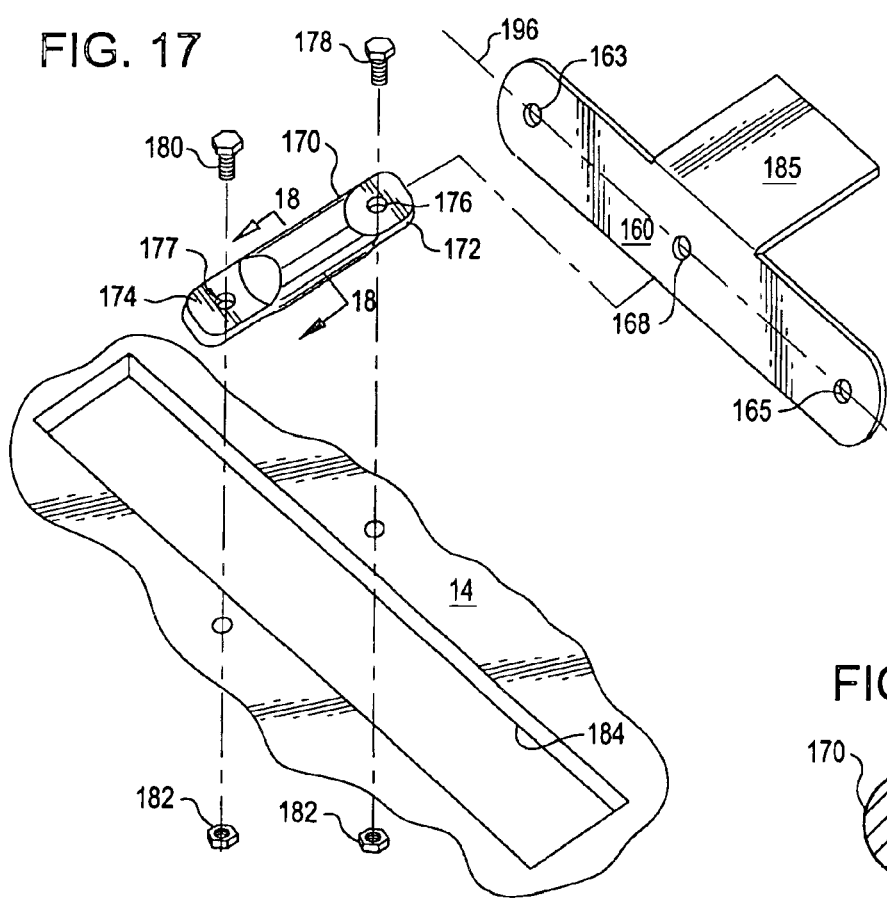
FIG. 17 provides a partial perspective view of a typical pivotable truck of the type just shown in FIG. 16, now showing how the pivotable truck is affixed to the frame via an axle, here shown with a unitary axle with swaged end with fastener holes adapted to receive fasteners therethrough to secure the axle to the frame.
Figure 18:
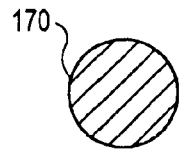
FIG. 18 provides a cross-sectional view of the unitary axle at the longitudinal location along the axle where the axle supports the pivotable truck, confirming that in one embodiment, an axle of circular cross-section may be utilized.

Attention is directed to FIGS. 16, 17, and 18, where further details of wheels and drive components are illustrated. In the embodiment illustrated in the just mentioned figures, a pair of driven wheels, for example, wheels 80 and 88, are rotatably affixed to pivotable truck 160 with wheel axles 162 and 164, respectively, located at wheel axle retaining apertures 163 and 165, respectively. A truck axle retainer defined by truck axle retainer edgewall 168 serves to pivotably receive truck axle 170 therein. In one embodiment, truck axle 170 is provided as a unitary circular rod (see the cross-section illustrated in FIG. 18) with swaged first 172 and second 174 ends each having therein a fastener receiving aperture, 176 and 177, respectively for receiving fasteners 178 and 180 therethrough. If threaded fasteners are utilized, nuts 182 are affixed to fasteners 178 and 180 to secure truck axle 170 to base 14. A normally rectangular shaped drive accommodating cutout, defined by drive unit wall 184, is cut through base 14. Motor 146 is affixed during operation to a suitable motor mount plate portion 185 of truck 160, such as by fasteners 186. Consequently, although at the centerline 188 of the truck, no up or down motion of the truck occurs with respect to the reference plane of the base 14, the wheels are allowed to move up and down, with motion up as indicated by reference arrow $M_U$ in FIG. 16, and motion down as indicated by reference arrow $M_D$ in FIG. 16. A maximum movement of the wheels may be allowed, indicated as $M_{U-MAX}$ and $M_{D-MAX}$ respectively. With respect to discussion at other parts of this disclosure, however, it must be noted that a robotic device acts as if the point of contact of the wheels is at a single point 190 on workpiece surface 194 that is directly below the truck axle 170 (i.e., normally perpendicular to the longitudinal axis 196 of the truck). Thus, a "three point" contact system is maintained, with one point of contact effectively at a point 190 beneath each one of the trucks 160, and with one point of contact at the pivoting wheel 72. As a result, like a three legged stool, robot 10 can easily traverse curved workpiece surfaces while maintaining three points of contact with the workpiece surface. The "three effective points of contact" configuration is further reinforced in FIG. 1, where the reference arrows I, J, and K are noted as force vectors about which contact force of robot 10 with a workpiece surface is disposed. Reference arrows J and K are of course equivalent to the reference arrow 192 discussed in connection with the truck 160 described and shown in FIG. 16.

Motors 144 and 146 are mounted on a motor platform 185. That platform is often a rectangular platform integrally formed along one edge with truck 160, but can also be separately formed and attached thereto. In one embodiment, the drive motors 144 and 146 are provided in the form of direct current electrical motors, and more usually (but not necessarily) in the form of 24 volt DC electrical motors. More specifically, use of a pittman type DC motor with encoder, utilizing a 187:1 gear reduction, has been found advantageous. Each one of the at least two drive motors is connected to drive one or more of said the at least two drive wheels of the robotic device 10. Alternately, pneumatic (air driven) or hydraulic (liquid driven) motors may be utilized for various applications as appropriate, especially where it simplifies the number of utility lines provided for a specific end effector application. Drive motors 144 and 146, regardless of motive force, are in one embodiment completely independent, so that the robot 10 is maneuverable via differential speed between drive motors 144 and 146, or by completely separate drive action of each motor, separate from the other(s) of the drive motors.

Figure 4:
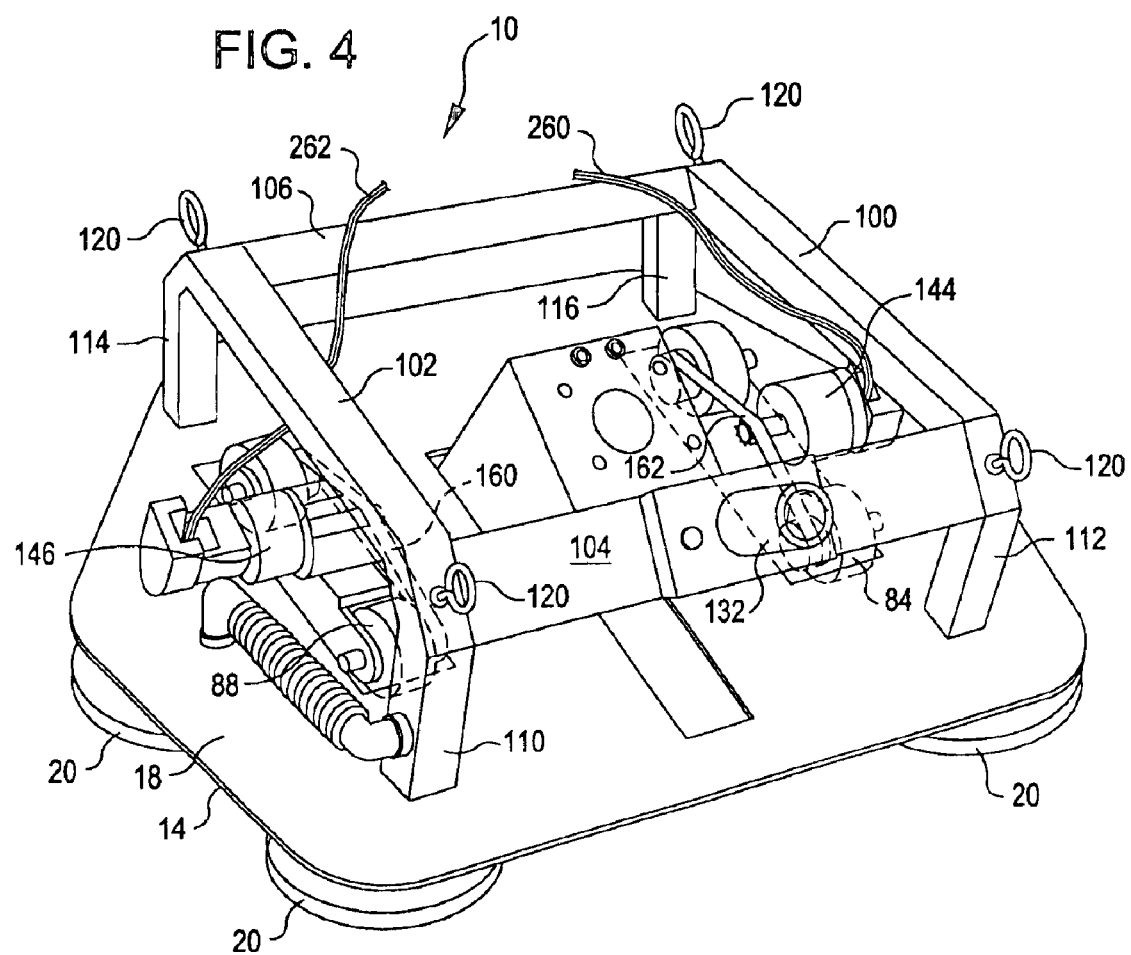
FIG. 4 is a rear perspective view of the robotic device as illustrated in FIGS. 2 and 3, now showing the use of separate vacuum tubing for connecting at least one vacuum cup to the vacuum header, as well as first and second pairs of traction devices.
Figure 5:
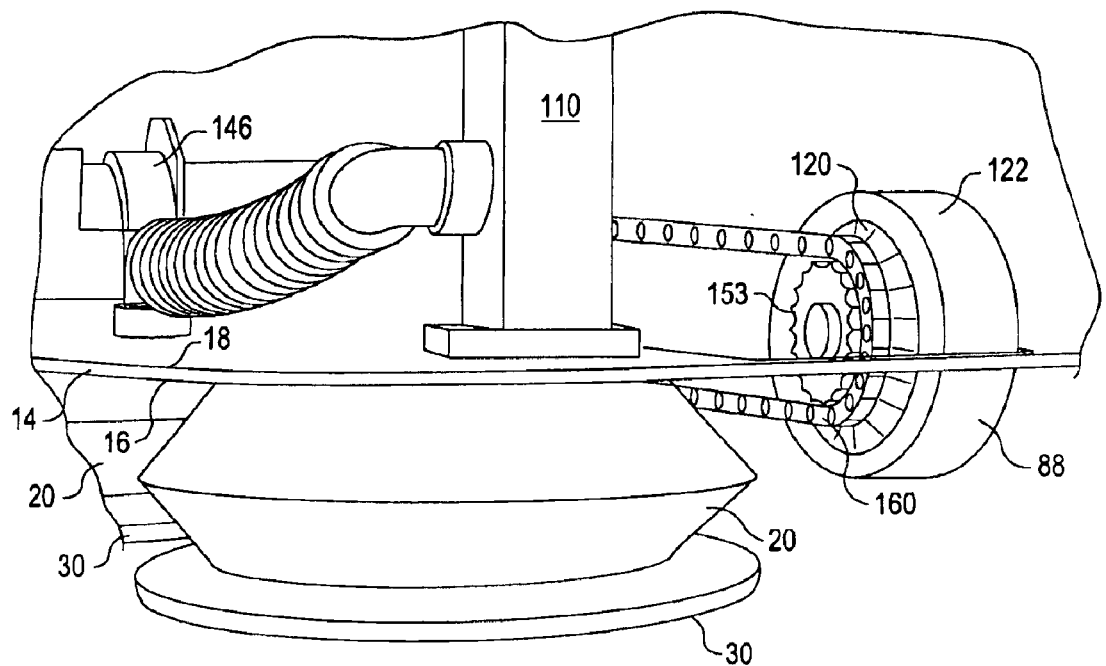
FIG. 5 is a side view of one corner of the robotic device, showing a vacuum cup in its fully extended, non-working position, and also more clearly showing a traction drive wheel with sprocket and chain drive.

As seen in FIG. 1, a mount 200 is provided for mounting a preselected inspection tool or working tool, such as a sander 202 (shown here in FIG. 1), or such as an eddy current testing device (as illustrated in FIGS. 2, 3, and 4). Many other devices, such as magnetic, laser or other optical unit, video, or other inspection or working devices, some of which have been mentioned above, can be carried by a suitably sized robotic device configured in accord with the disclosures herein. For example, in the device shown in FIGS. 1, 2, 3, and 4, a small robotic device 10 having a weight of about 9 pounds can carry an working tool or an inspection tool via vacuum adhering means described herein along a surface 12 to be inspected. However, larger units configured in the same manner can carry payloads of up to 70 pounds, or more. As illustrated in FIG. 1, a typically suitable sander would be a Dynabrade brand orbital sander, Model 57810, such as is available from Dynabrade Industrial Power Tools of Clearance, N.Y. (http://www.dynabrade.com). The model 57810 has a weight of 2.75 pounds (1.25 kg) and utilizes compressed air at 2 cubic feet per minute (368 LPM) at 90 psig (6.2 Bars) with a pad size of 3-⅔ inches width by 7 inches long.

To appreciate the capability of the robotic device shown herein, note that to slide the robotic device 10 while all six vacuum cups 20 are operating with about 3 inches of mercury vacuum, takes about 500 inch-ounces of force, when the combined weight of the robotic device 10 and the tool 202 is about 18 pounds. In the configuration illustrated, about 30 pounds force are developed by each vacuum cup 20 when the cups are operating at the aforesaid 3 inches of mercury vacuum. It must be further considered by the reader that the robotic device 10 disclosed and described herein does not move via "stepping", i.e., sequential positioning, and then repositioning, of the vacuum cups 20. Rather, the foot 30 of each of the vacuum cups 20 slides over the workpiece surface 12 being inspected or worked, while, at the same time, a sufficient number of vacuum cups 20 maintain vacuum so as to adhere the robotic device 10 to the workpiece surface 12.

Figure 8:
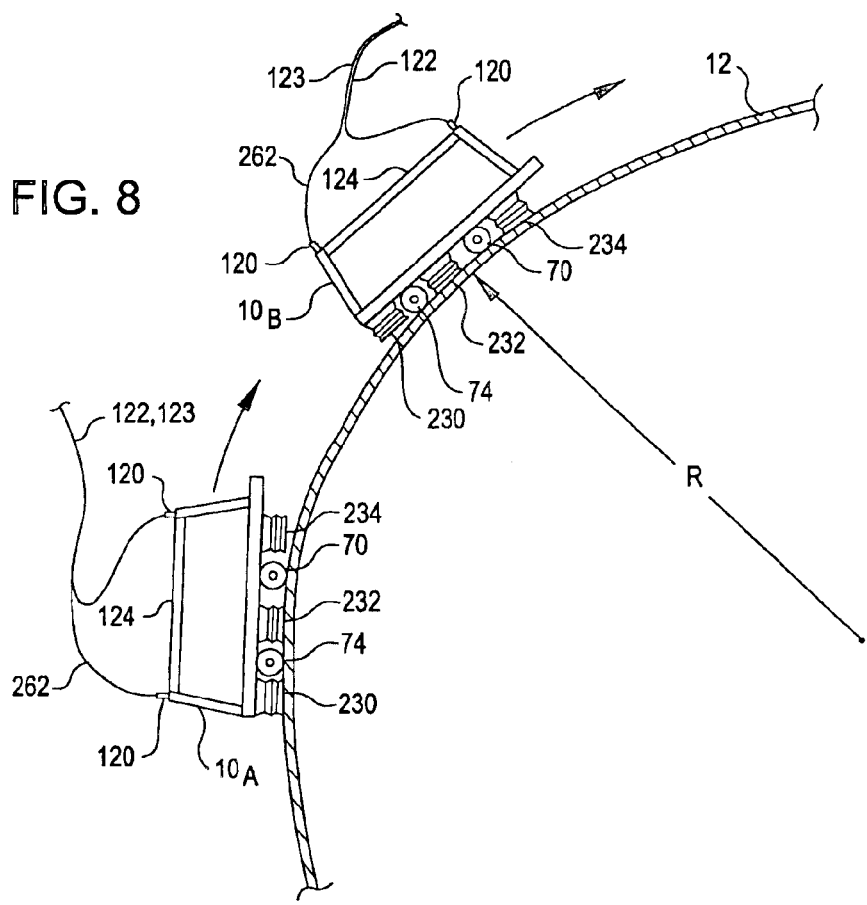
FIG. 8 is a schematic view illustrating one embodiment of a robot device illustrating a method of travel over a curved surface, wherein a first pair of vacuum cups loses suction while a curve surface is first traversed, but wherein the first pair of vacuum cups regain suction as the robotic device follows the curved surface further.

Turning now to FIG. 8, with the embodiment shown herein, vacuum cup pairs 230, 232, and 234 are shown. While utilizing any two of the three pair 230, 232, and 234 vacuum cups 20, a working radius R as small as two foot can be negotiated by a suitable sized robotic device 10. For example, robotic device $10_A$ is shown starting to negotiate an outside radius, and the front pair 234 of vacuum cups has lost effective contact with surface 12. However, by the time the device reaches the position illustrated by robotic device $10_B$, the front pair 234 and the center pair 232 of vacuum cups are effective, although the rear pair 230 of vacuum cups 20 have now lost effectiveness. And, it should be understood that although pairs of vacuum cups have been utilized for purposes of illustration, the method taught herein is not considered limited to merely "pairs", but should be thought of as a method for providing plurality of cooperating vacuum cups, i.e., a set, however so many as might be suitable for general purposes or for a specific or specialized purpose.

Figure 14:
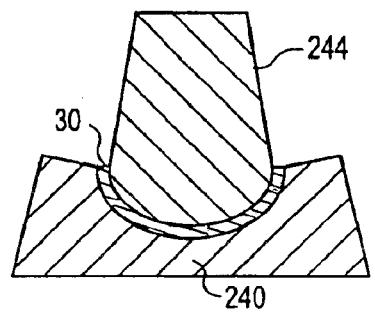
FIG. 14 shows the use of molds in forming a thin, low friction, C-shaped Teflon foot for a vacuum cup.
Figure 15:
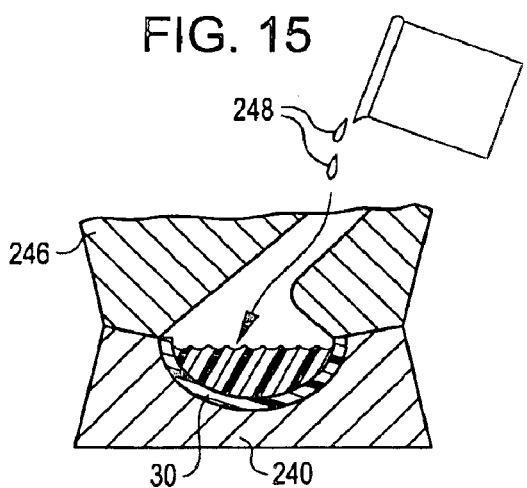
FIG. 15 shows the use of molds in forming a vacuum cup, now showing the pouring of a suitable resilient curable composition into molds for the forming of a vacuum cup, above the just formed low friction Teflon foot first shown in FIG. 14.

Attention is directed to FIGS. 6, 14, and 15, where further details of the unique vacuum cups 20 are noted. To form the unique vacuum cups 20, I have found it advantageous to provide a thin Teflon sheet 30, normally of about 0.005 inch, or more, into a first mold 240 in the desired vacuum cup shape (normally an annular shape with a generally C-shaped lower contact face 242. A complementary second mold 244 is provided to clamp the Teflon sheet 30 into the desired generally upwardly opening C-shaped foot configuration. With the first, external 240 and second, internal 244 molds in place, the Teflon sheet 30 is baked at about 375 degrees F. for about 2 hours, or until the Teflon absorbs and retains the desired shape when cooled to ambient temperature. Then, as indicated in FIG. 15, a third, complementary mold 246 is utilized and thereunto is poured a desirable resilient compound 248 to bond directly to the preformed Teflon foot portion 30. I prefer to use an air cure polyurethane (after vacuum bubble removal—degas at 29 inches mercury vacuum for at least 10 minutes), which sets up after at least 12 hours, and more preferably 24 hours, and which ideally is allowed to cure for at least 48 hours, and which hardens into about a 50 Shore A durometer polyurethane rubber. As shown in FIG. 6, I have found it advantageous to provide at least ¼ inch thickness (see reference letter A in FIG. 6) of polyurethane backing above the 0.005 inch (see reference letter B in FIG. 6) of non-stick, preferably Teflon portion of the vacuum cup 20 foot, with a width W of at least about one inch. And, while I have found it advantageous to utilize a pair of V-shaped compressible portions 34, more or less than two such portions are equally capable of serving in the functional capabilities required, to provide the compression range distance D as above described. What is necessary is that a suitable accordion pleat bellows shape is configured in a flexible elastomer in which the vacuum cup 20 is shaped, and that a low-stiction surface 250 is provided for a vacuum cup foot.

Figure 7:
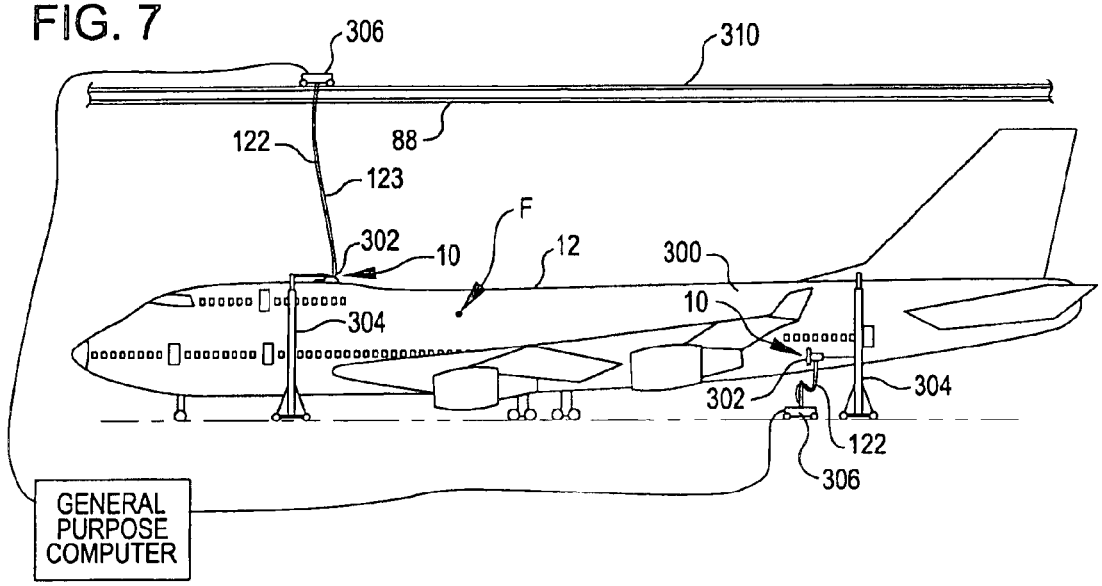
FIG. 7 is a schematic view showing the use of a robotic device in conjunction with an exemplary tracking system while conducting a non-destructive inspection of an aircraft, and while collecting data for storage in a database in a general purpose computer.

FIG. 7 illustrates a robotic device 10 as utilized for nondestructive inspection of an aircraft 300. For laser control, a retro-reflector or cat's eye 302 is mounted on the robot device 10 as the device rides on the surface 12 of aircraft 300. In the non-destructive inspection system, one or more robots 10 are mounted to travel across the surface 12 of the aircraft 300. In practice, for example, three different robots 10 can be utilized along with six laser tracking units 304 when inspecting a large commercial aircraft. As shown in FIG. 7, a movable carriage 306 is associated with each robot 10 and includes, or is further connected to a remote vacuum pump, which in any event is connected by a suitable conduit in umbilical 122 to the vacuum manifold outlet 132 on the robot 10. In addition, electrical feed lines 260 and 262 are connected between the carriage 306 and the robot 10. As illustrated in FIG. 7, one of the carriages 306 is mounted to travel on an overhead track 310 and is connected to a robot 10 which is adapted to move across the upper surfaces of the aircraft 300, while a second carriage 306 travels on the ground and is operably connected to a second robot 10 that traverses the lower surfaces of the aircraft 300.

In carrying out the non-destructive inspection, the vacuum system is initially started to create a vacuum in the vacuum cups 20 and enable the robotic device 10 to adhere to the surface 12 of the aircraft 300. The aircraft 300 has certain tooling locations, or depressions, located at various positions and which are used as reference points to take dimensions during the manufacture and set-up of the aircraft. These depressed reference points are generally referred to as fiducials F. Through a suitable control interface, drive motors 144 and 146 on the robot 10 are then actuated to move the robot 10 over the aircraft surface 12 until the sensor 302 is engaged with a fiducial F. Through the computer control and location system, this is established as an origin point. As a large aircraft generally has a number of fiducials $F_1$, $F_2$, etc, so the robot 10 is moved and engaged with each fiducial F to obtain a series of origin points.

The desired operating program is selected in the computer, then actuates the program to operate the motors 144 and 146 to move the robot 10 in the desired path of travel on the aircraft 300 surface 12. Usually, at time of the first pass inspection, the interior of the aircraft 300 is under atmospheric pressure. As the robot 10 moves across the aircraft surface the sensor 302 will ride above the surface as carried by the base of the robot 10. For example, as described in the tracking system of U.S. Pat. No. 4,714,339, the disclosure of which is incorporated herein by this reference, a laser beam is directed from tracking unit 304 to the target, which is the retro-reflector 302 mounted on robot 10, and the retro-reflector 302 reflects a beam back to a tracking unit 304. Photosensors attached to the tracking unit 304 provide error signals to a servo system, which controls optics at the tracking unit to provide the direction necessary to accomplish the coincidence of the beams. The separation of the incident or source beam and the reflected beam are measured and by measuring the direction of the beams relative to the tracking unit or tracking point, the target can be located in spatial coordinates and the orientation of the retro-reflector 302 can be continuously determined, thus providing a surface map of the aircraft 300. Similar mapping can also be achieved by use of suitable infrared tracking systems, using a suitable X-Y-Z coordinate photosensor system.

After the surface mapping of the entire aircraft 300 has been completed, the interior of the aircraft is usually then pressurized at about 1 atmosphere of pressure, and the surface mapping operation is repeated. If any portion of the aircraft surface 12 shows a deviation under pressurized conditions beyond a given tolerance it can indicate a potential defect in the surface, such as a crack or faulty fastener. Any potential defective area can then be manually inspected.

By using the robot 10 in conjunction with a suitable tracking system, surface mapping of the aircraft 300 can be accomplished to determine potential areas of defect without the necessity of stripping paint from the aircraft surface and without the need of a manual inspection of the entire aircraft surface. As the paint stripping, manual inspection, repainting and waxing operations are eliminated, the overall time and cost for the inspection is greatly reduced.

Figure 13:
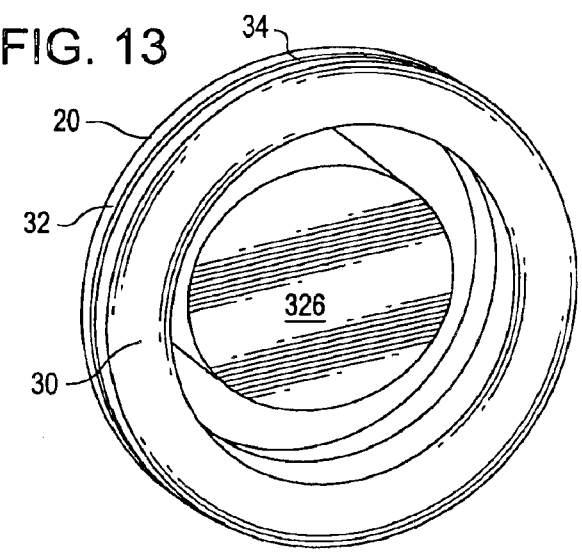
FIG. 13 illustrates an exemplary vacuum cup adapted for sealingly containing waste effluent such as dust, water, solvent, etc., generated by a tool mounted therein, with, in this FIG. 13, showing a sander adapted for vacuum extraction of sanding dust created thereby.
Figure 11:
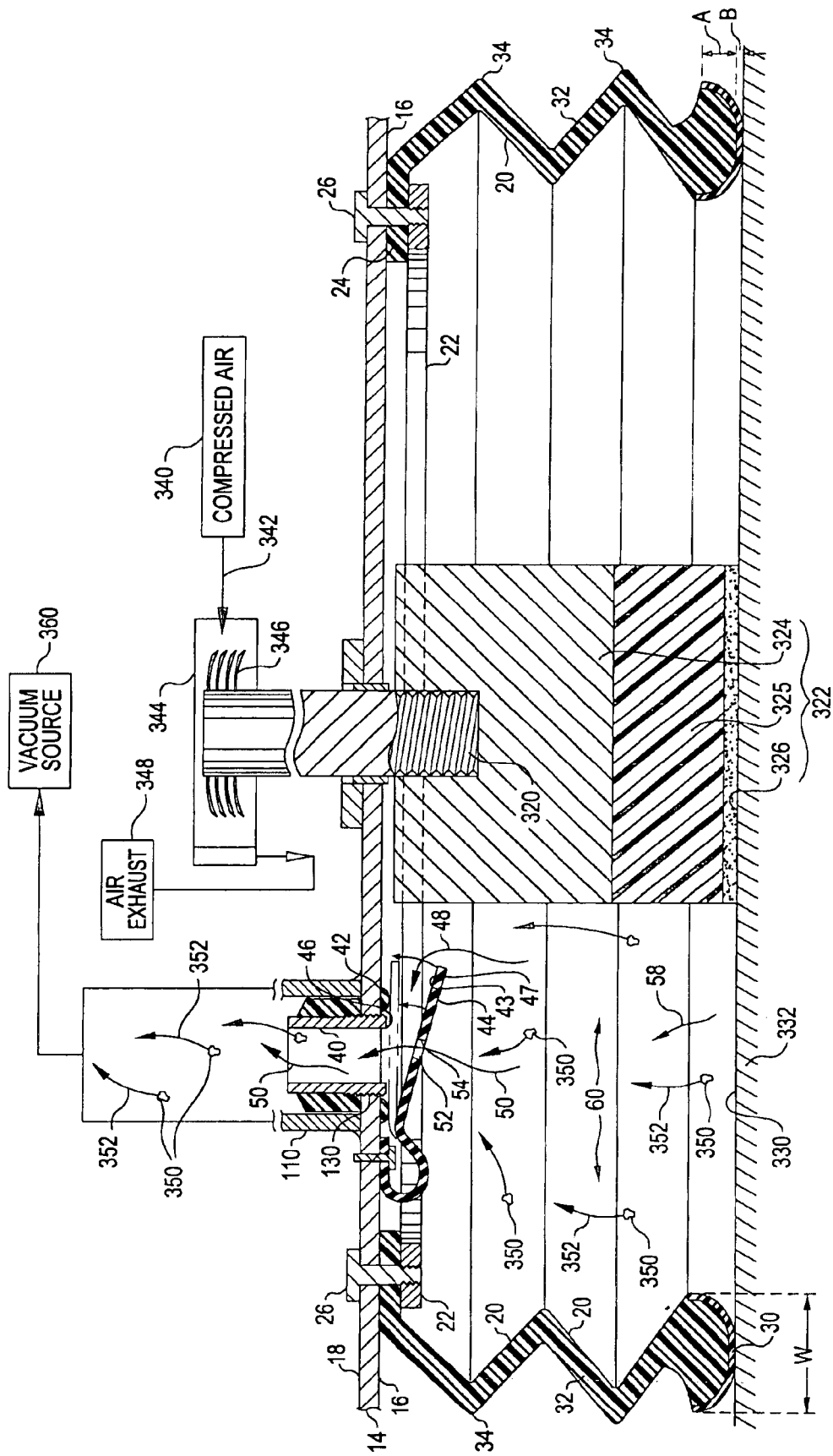
FIG. 11 provides a cross-sectional view of a tool mounted within an exemplary vacuum cup, as well as a schematic indication of key utility lines for incorporating the use of a compressed air driven tool in conjunction with a surface adhering robot, wherein a vacuum source is utilized for adhering the robot to a workpiece surface, and wherein the vacuum source is simultaneously utilized for removal of waste residuals from the work being conducted, such as dust, water, solvent, or other similar fume or particulate stream.

With respect to operations such as washing, waxing, sanding, etc. it may be advantageous to incorporate, in combination, a suitable working tool and a vacuum cup 20 as above described, as further depicted in FIG. 11. Here, a vacuum cup 20 has a centrally mounted shaft 320 driven sander 322 having a rotating body 324, a resilient tool mounting pad 325, and a sandpaper or other abrasive surface 326 to act on the surface 330 of a workpiece 332. An exemplary rotary sander, such as depicted in FIG. 13, is driven by compressed air 340, often at 90 psig (more or less), which can be supplied by hose 342 to the head 344 of sander 322 for turning air driven turbine 346. After turning the shaft 320, the air is usually exhausted to an air exhaust outlet 348. Incorporating of the sander into the vacuum cup 20 is advantageous since particulates 350 which are generated by the sanding operation are advantageously swept outward in the direction of reference arrows 352, and ultimately are swept toward vacuum source 360, usually for separation at or near a vacuum pump located at the vacuum source 360. A suitable random orbital sander as depicted in FIG. 13 would be a Dynabrade brand sander, Model 58215, such as is available from Dynabrade Industrial Power Tools of Clearance, N.Y. (http://www.dynabrade.com). The model 56215 has a weight of 1.9 pounds and utilizes compressed air at 2 cubic feet per minute (368 LPM) at 90 psig (6.2 Bars) with a pad size of 5 inches diameter.

Figure 10:
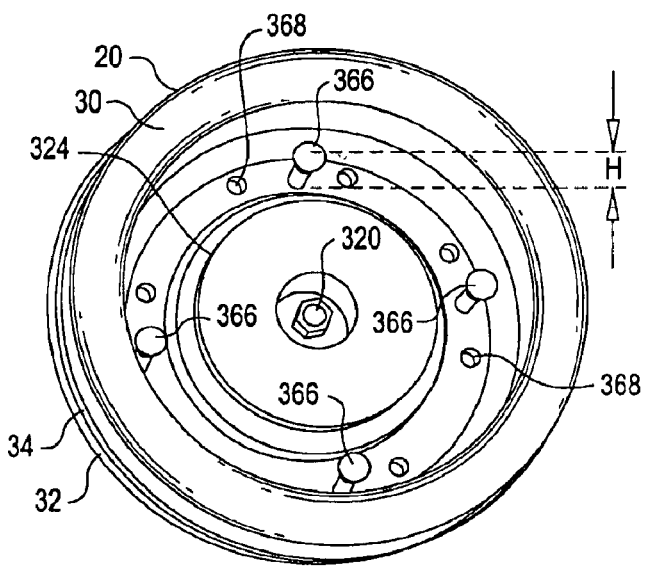
FIG. 10 illustrates a driven device within a vacuum cup, such as may be used for scrubbing, washing, waxing, polishing, etc., which device may be pneumatically driven such as by compressed air and residuals removed by vacuum flow from the vacuum cup., and carried by an embodiment of the robotic device disclosed herein.

A perspective view of one embodiment for a vacuum cup 20 mounted sander 322 is shown in FIG. 10. In FIG. 10, a vacuum cup 20 is shown with a rotating body 324. Here, the further use of low friction stops 366 is illustrated, as suitable for spacing a brush (as set forth in FIG. 12) from a workpiece substrate, is shown. In such a case, mounting ring 22 can be provided with additional stop mount receivers 368, so that threaded stops 366 can be mounted in stop mount receivers 368, and adjusted to an appropriate height H to limit the working compressive range of the vacuum cup 30.

Figure 12:
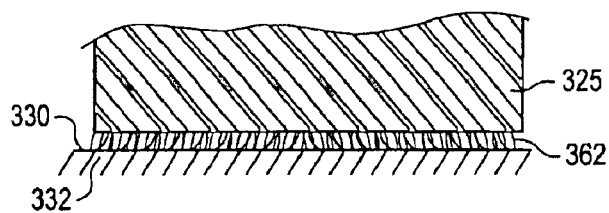
FIG. 12 provides a cross-sectional view of a tool for use on a robot, and which can be mounted within an exemplary vacuum cup in the manner depicted in FIG. 11, where the tool comprises a brush surface, which may be provided in a precise configuration as known by those of ordinary skill in the art and to which this specification is directed as suitable in each specific instance of use, for cleaning, washing, waxing, buffing, painting, and the like, as necessary under a particular circumstance.

As further identified in FIG. 12, the resilient tool mounting pad 325 can also be advantageously utilized for mounting of a brush 362, useful for washing, waxing, polishing, buffing, painting, or like operations.

Figure 9:
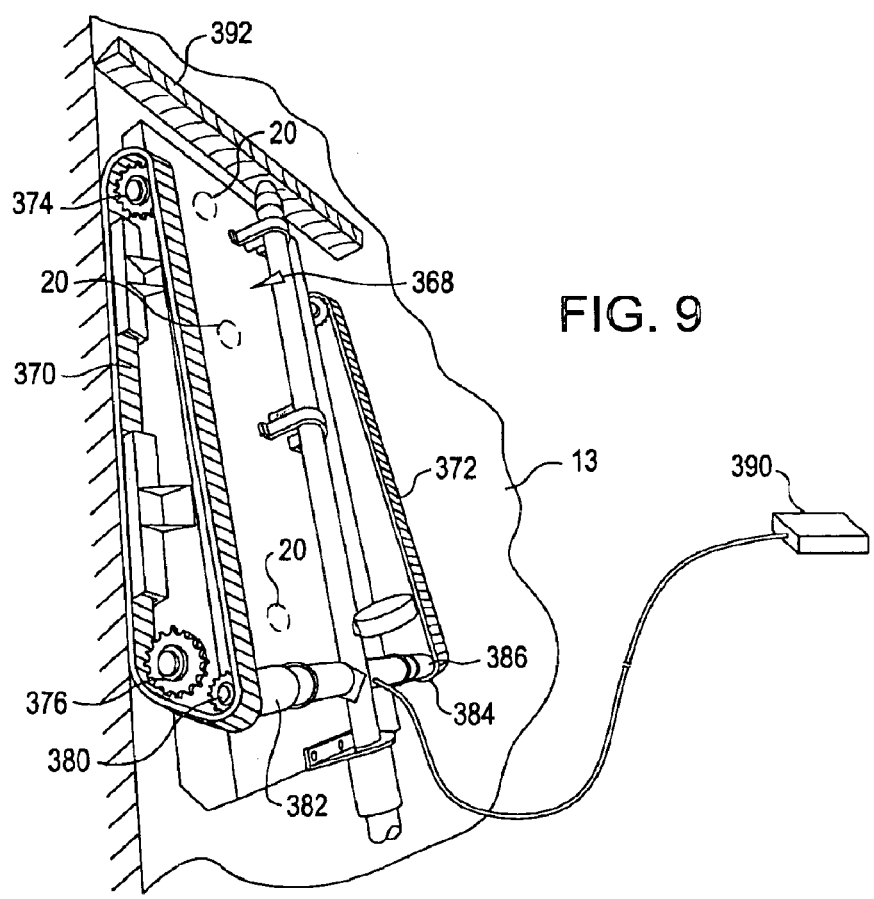
FIG. 9 illustrates yet another embodiment of a surface adherent robotic device similar to those already depicted, but now showing a device that utilizes a pair of endless belt tracks for drive traction, rather than driven wheels as shown in FIGS. 1, 2, and 3 above, and also configured for carriage of a squeegee as part of a window cleaning operation.

In yet another embodiment as illustrated in FIG. 9, robot 368 is driven by first 370 and second 372 endless belt tracks are spaced between forward idler sprockets 374 and rearward idler sprockets 376. Tracked belt 370 is driven by drive sprocket 380, which is energized by drive motor 382. Similarly, belt 372 is driven by drive sprocket 384 which is energized by drive motor 386. Drive motors 382 and 386, as well as other tool or inspection functions, are controlled by a remote control unit 390. Here, robot 368 is adhering to window 13. The robot 368 is carrying a squeegee 392 for cleaning window 13. Washing brushes can be provided for robot 368 in the manner just described and shown in FIGS. 10 and 12, or another suitable arrangement. Robot 368 can be provided in a manner to adhere to window 13 by a suitable number of vacuum cups 20 (shown in hidden lines), such as 3 or more, which as a minimum quantity should be sufficient in most applications to assure that robot 368 can traverse discontinuities and maintain its moving adherent capability on a selected workpiece. However, the use of 3 pairs might be more conservative, similar to the designs shown for other embodiments illustrated herein.

It is to be appreciated that various aspects and embodiments of the compact robot designs described herein are an important improvement in the state of the art of tool carrying robotic devises. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention (s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A robotic apparatus for traversing a workpiece surface, said apparatus comprising:
   (a) a base, said base having a bottom side and an upper side;
   (b) a plurality of vacuum cups, each of said vacuum cups comprising
      (1) a foot, said foot having a low friction wear surface coating,
      (2) a sidewall comprising one or more resilient accordion pleats (34);
      (3) an outlet port, said outlet port having an inlet portion
      (4) a fluid limiting valve, said fluid limiting valve located in fluid communication with and adapted to at least partially close said outlet port when said vacuum cup experiences loss of vacuum;
   (c) at least three points of support for said base, said at least three points of support for said base, spacing said base apart from yet located close to the workpiece surface being traversed, so as to limit compression of said vacuum cups between said bottom side of said base and the surface being traversed, and
      (1) providing at least two contact points having driving traction relative to said workpiece surface being traversed;
      (2) providing at least one pivotable contact point adapted to allow said robotic device to turn along a direction of travel.

2. The apparatus as set forth in claim 1, further comprising a vacuum header, and wherein each of said vacuum cups is in fluid communication with said vacuum header.

3. The apparatus as set forth in claim 2, wherein said vacuum header comprises a tubular frame.

4. The apparatus as set forth in claim 2 or in claim 3, wherein said base comprises a plurality of vacuum apertures therethrough, and wherein said vacuum apertures are in fluid communication with said vacuum header.

5. The apparatus as set forth in claim 4, wherein a plurality of vacuum cups are mounted on a bottom side of said base in fluid communication with one or more of said vacuum apertures in said base.

6. The apparatus as set forth in claim 1, wherein said fluid limiting valve comprises a reed valve.

7. The apparatus as set forth in claim 1, wherein said outlet port further comprises an outlet seal, and wherein said fluid limiting valve comprises a seal seat portion that sealingly seats against said outlet seal, and wherein said fluid limiting valve is responsive to fluid flow to move between (a) a normal flow, open position, wherein said valve allows fluid flow unimpeded through said outlet, and (b) a vacuum loss, closed position, wherein fluid flow toward said outlet valve closes said valve so that said seal seat portion of said valve sealingly seats against said outlet seal.

8. The apparatus as set forth in claim 7, wherein said fluid limiting valve further comprises an open minimum flow outlet, said open minimum flow outlet sized and shaped to allow a preselected fluid flow out of said open minimum flow outlet when said fluid limiting valve is in the vacuum loss, closed position.

9. The apparatus as set forth in claim 1, wherein each of said at least two drive contact points comprise wheels.

10. The apparatus as set forth in claim 9, wherein each of said wheels comprise a urethane rubber wheel surface.

11. The apparatus as set forth in claim 9, wherein in said urethane rubber wheel surface comprises a urethane rubber having a durometer at least as soft as 30 Shore A hardness.

12. The apparatus as set forth in claim 11, wherein each of said drive motors is independent, and wherein said robot is maneuverable via differential speed between drive motors, or by separate drive action each from the other of said drive motors.

13. The apparatus of claim 12, wherein said surface sensor comprises a sensing member disposed to ride on said surface, a support to carry said sensing member, a mount for mounting the support for sliding movement relative to said base in said direction.

14. The apparatus as set forth in claim 9, further comprising at least two drive motors, each of said drive motors connected to drive one or more of said at least two wheels.

15. The device as set forth in claim 9, wherein said drive motors and wheels are operably connected by an endless drive member.

16. The apparatus as set forth in claim 15, further comprising
   (a) a surface sensor mounted on said base and disposed to ride on a workpiece surface as said robotic device traverses said workpiece, said surface sensor being movable in accordance with deviations in said workpiece surface in a second direction and at an angle to the direction of movement of the robotic apparatus, and
   (b) sensors responsive to movement of said surface sensors in said second direction to generate a surface map of said surface.

17. The apparatus of claim 16, wherein said surface sensor comprises a sensing member and a mount, said sensing member adapted for sensing movement in said second direction, said second direction being generally normal to a plane extending downward through the lower runs of said endless drive members.

18. The apparatus as set forth in claim 9, wherein each of said wheels has a idler sprocket affixed thereto, and wherein each of said drive motors has a drive sprocket affixed thereto, and wherein said one of said drive motors and one of said wheels are drivingly connected by a linked chain.

19. The apparatus as set forth in claim 9, further comprising a pair of trucks pivotablly affixed to said base, and wherein two pairs of said wheels are provided, and wherein one pair wheels is rotatably affixed to one of said trucks, and wherein each one of said wheels has an idler sprocket affixed thereto, and wherein each of said drive motors has a drive sprocket affixed thereto, and wherein said one of said drive motors and each one of said wheels on each one of said pair of trucks are drivingly connected by a linked chain.

20. The apparatus as set forth in claim 1, wherein said at least two drive contact points each comprise endless resilient tracks.

21. The apparatus as set forth in claim 20, further comprising at least two drive motors, each of said drive motors connected to drive one or more of said at least two endless resilient tracks.

22. The apparatus as set forth in claim 21, wherein one of said drive motors and one of said at least two endless resilient tracks are operably connected by an endless drive member.

23. The apparatus of claim 15, or of claim 22, wherein said endless drive member comprises a link chain.

24. The apparatus as set forth in claim 14, or in claim 21, wherein said drive motors are selected from the group consisting of (a) direct current electrical motors, (b) pneumatic motors, and (c) hydraulic motors.

25. The apparatus as set forth in claim 1, further comprising a laser beam retro reflector mounted on said base in position to receive and reflect a laser beam from a laser tracking unit.

26. The apparatus of claim 25, wherein said retro reflector is mounted generally centrally of said base and projects upwardly above said base.

27. The apparatus of claim 25, further comprising biasing means for biasing said sensing member toward said surface.

28. A robotic apparatus for traversing a workpiece surface, said apparatus comprising:
  (a) a base, said base having a bottom side and an upper side;
  (b) a plurality of vacuum cups, each of said vacuum cups comprising
    (1) a foot, said foot having a low friction wear surface coating,
    (2) a sidewall comprising one or more resilient accordion pleats (34);
    (3) an outlet port, said outlet port having an inlet portion
    (4) a fluid limiting valve, said fluid limiting valve located in fluid communication with and adapted to at least partially close said outlet port when said vacuum cup experiences loss of vacuum;
  (c) at least three points of support for said base, said at least three points of support affixed to said base and adapted to limit the distance of said base relative to the workpiece surface being traversed, so as to limit compression of said vacuum cups between said bottom side of said base and the surface being traversed, and
    (1) providing at least two contact points having driving traction relative to said workpiece surface being traversed;
    (2) providing at least one pivotable contact point adapted to allow said robotic device to turn along a direction of travel.

* * * * *